March 31, 1970 E. G. SUNDBERG 3,503,807
STORAGE BATTERY HAVING TUBULAR TYPE PLATES AND
UNITARY COVER THEREFOR
Filed July 14, 1967 4 Sheets-Sheet 1
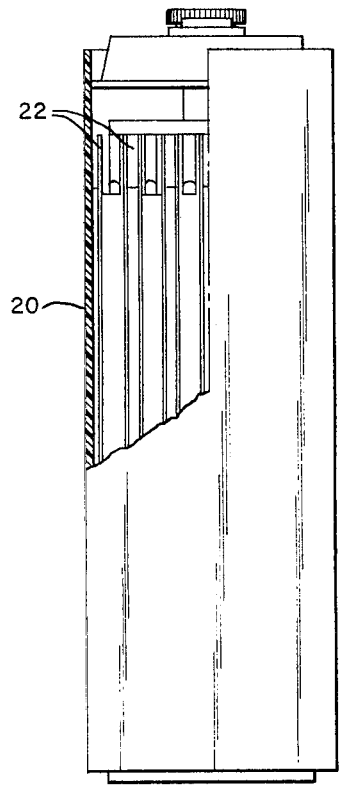
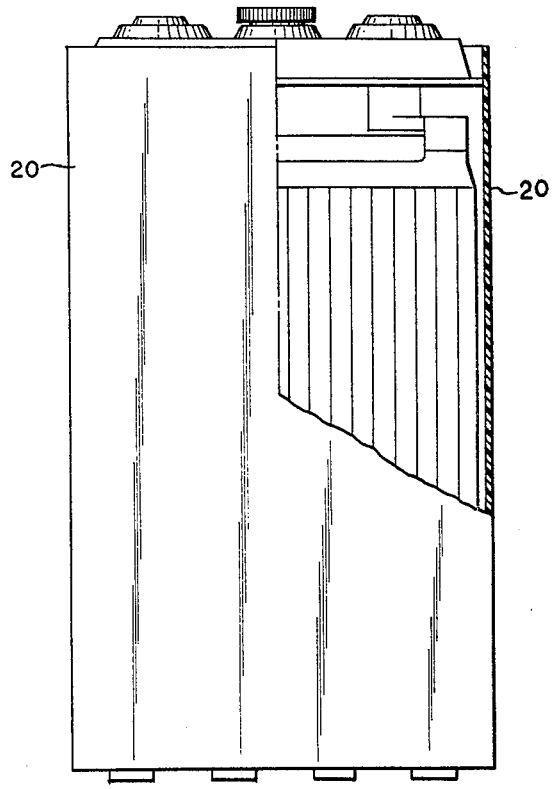
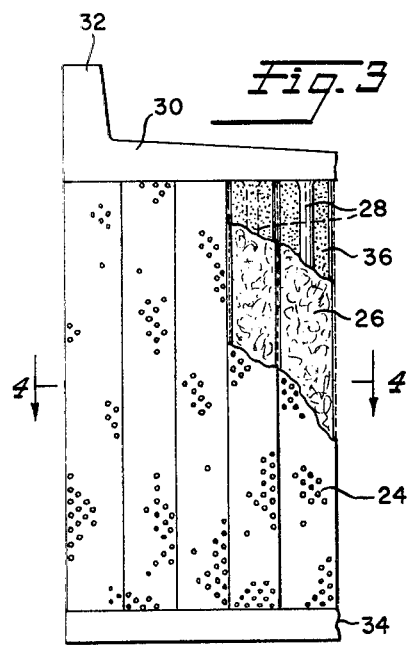
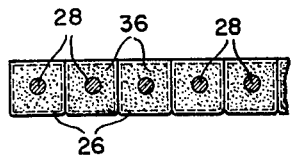
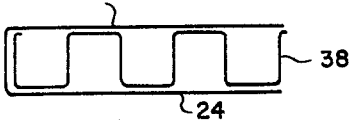
INVENTOR
ERIK GUSTAV SUNDBERG
BY
Burns, Doane, Benedict, Swecker & Mathis
ATTORNEYS March 31, 1970        E. G. SUNDBERG        3,503,807
STORAGE BATTERY HAVING TUBULAR TYPE PLATES AND
UNITARY COVER THEREFOR
Filed July 14, 1967                         4 Sheets-Sheet 2

INVENTOR
ERIK GUSTAV SUNDBERG

BY
Burns, Doane, Benedict, Swecker & Mathis
ATTORNEYS

March 31, 1970  E. G. SUNDBERG  3,503,807
STORAGE BATTERY HAVING TUBULAR TYPE PLATES AND
UNITARY COVER THEREFOR
Filed July 14, 1967  4 Sheets-Sheet 3

INVENTOR
ERIK GUSTAV SUNDBERG

BY
Burns, Doane, Benedict, Swecker & Mathis
ATTORNEYS

March 31, 1970  E. G. SUNDBERG  3,503,807
STORAGE BATTERY HAVING TUBULAR TYPE PLATES AND
UNITARY COVER THEREFOR
Filed July 14, 1967  4 Sheets-Sheet 4
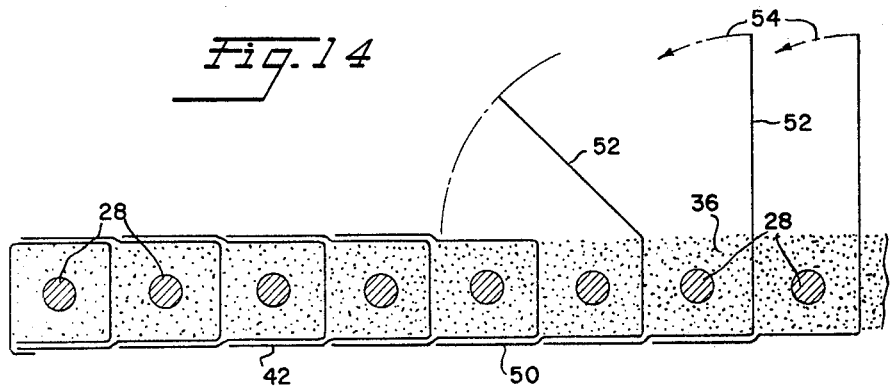
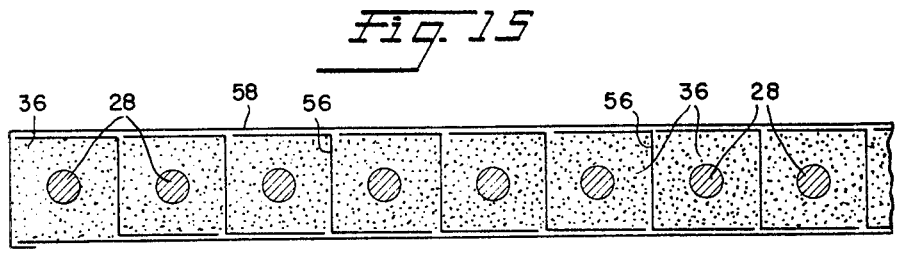
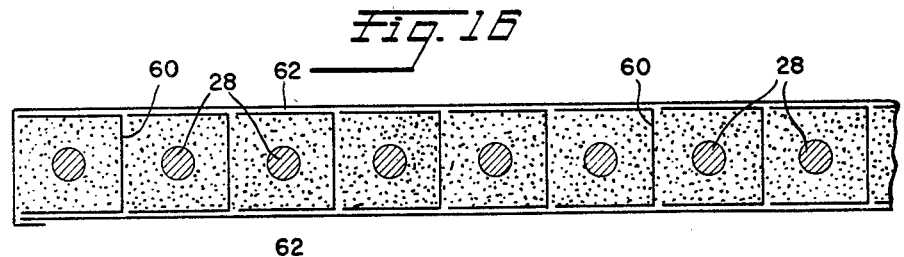
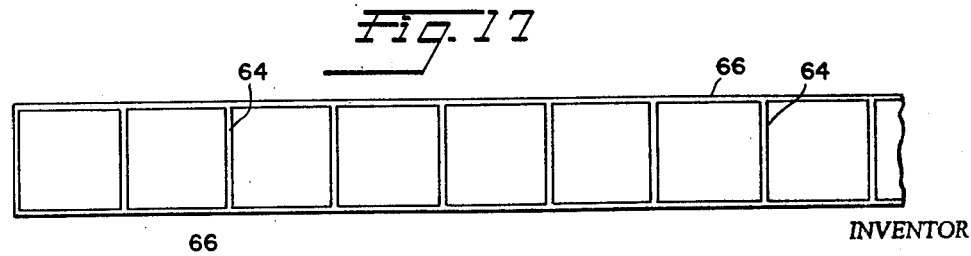
INVENTOR
ERIK GUSTAV SUNDBERG
BY
Burns, Doane, Benedict, Swecker & Mathis
ATTORNEYS

United States Patent Office 3,503,807
Patented Mar. 31, 1970

3,503,807
STORAGE BATTERY HAVING TUBULAR TYPE PLATES AND UNITARY COVER THEREFOR
Erik Gustav Sundberg, Osbacken, Nol, Sweden, assignor to Aktiebolaget Tudor, Stockholm, Sweden, a corporation of Sweden
Filed July 14, 1967, Ser. No. 653,379
Claims priority, application Sweden, Mar. 14, 1967, 3,485/67; Apr. 21, 1967, 5,617/67
Int. Cl. H01m 35/04, 3/00
U.S. Cl. 136—43          13 Claims

ABSTRACT OF THE DISCLOSURE

An electric storage battery having positive tubular plates consisting of a plurality of electrically conductive rods in contact with active material and the active material being surrounded with a unitary cover of electrically insulating material. The cover for all the rods comprising at least two layers secured together of a material that is resistant to acid and to the reactions in the battery.

BACKGROUND OF THE INVENTION

The present invention concerns electrodes for galvanic elements, especially for electric storage batteries of the lead-acid type with positive tubular plates consisting mainly of a plurality of rods of conductive material connected at both ends by suitable connections, each individual rod being in contact with active material and the active material being surrounded with a novel cover or casing. The cover or casing is, in accordance with the invention, made of electrically insulating material that is resistant to the electrolyte and to the reactions in the electrolytic cell, but which permits the passage of electrolyte while retaining the active material in place.

It has been the prior practice to make such tubular covers from a fabric of glass wool or equivalent fiber material enclosed by an outer thin walled perforated tube of a plastic foil. Such covers have also been made of a woven or plaited hose of fibrous material, which hose is treated so that it maintains its tubular form and is self supporting. Additionally, it has been proposed, first to place active material in paste form on the conductive rods of the electrode and, after the paste has hardened, to wind a fibrous cover in the form of a band or spiral around the paste coated electrode rods.

Of the constructions hitherto introduced some have obvious advantages, while others have been replaced as being inadequately suited for actual use of the battery in its practical applications. One disadvantage connected with the prior efforts is that the electrode covers that have been found most effective are relatively expensive to produce for the reason that it is difficult to place them on the plural electrode element assemblies.

The electrode according to the present invention is characterized in that the covers for all the conductive rods or elements which comprise the electrode assembly are produced as a single unit. Such a cover may consist of a number of tubes corresponding to the number of electrode rods, which tubes may be substantially square or rectangular in cross section to facilitate a side by side arrangement. These tubes may be lined on the inside with a fabric or a felt of glass wool and may in themselves be a thin walled, perforated foil of a synthetic material such as polyvinyl chloride or polyester.

The cover according to the present invention has been found to have significant advantages compared to previously known covers. It has been found that the capacity of the electrolytic cell is higher with the use of electrodes according to the present invention for the reason that the cover requires comparatively very little space in itself, thus allowing a larger portion of the available space to be occupied by active material. The cover is furthermore simpler to make than hitherto known electrode covers, is simpler to place on the electrode, and effectively prevents the disassociation of active material from the rods.

THE DRAWINGS

FIGURE 1 is an end view of a storage battery partially cut away so as to show a portion of an electrode assembly positioned therein.

FIGURE 2 is a side view of a storage battery partially cut away so as to show a portion of the electrode assembly positioned therein.

FIGURE 3 is a side view of one-half of an electrode cut away so as to show the construction thereof.

FIGURE 4 is a plan view in cross-sectional taken at line 4—4 through the electrode of FIGURE 3.

FIGURE 5 is a diagrammatic view to an enlarged scale of an electrode showing the parts of the outer convoluted cover that may be formed as a unitary member and used in an electrode.

FIGURE 14 is a cross-sectional view of the electrode illustrating a method of inserting the active material and bending the cover members to form the jacket for the active material.

FIGURE 15 is a view similar to FIGURE 14 but showing an alternative method of construction of the electrode utilizing Z-shaped elements.

FIGURE 16 is a view similar to FIGURES 14 and 15 showing still a further method of construction of the electrode utilizing C-shaped elements.

FIGURE 17 is a cross-sectional view of the electrode showing a construction thereof utilizing tubes of square cross-section.

THE PREFERRED EMBODIMENTS

Figure 6:
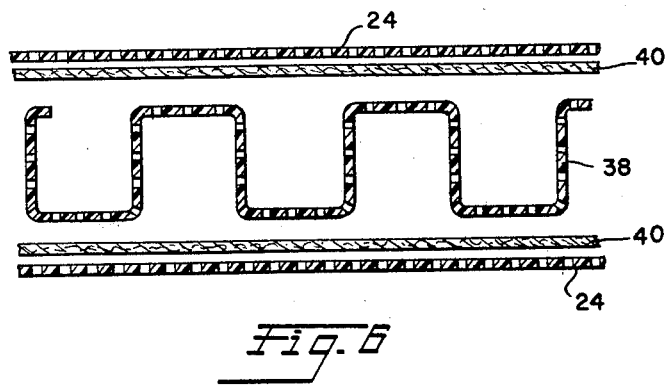
FIGURE 6 is an enlarged view similar to that of FIGURE 5 showing the use of a layer of insulating fibers around the faces of the active material (not shown) of the electrode.

Referring now to the drawings, the positive and negative electrodes are mounted within the battery case 20 and are interleaved with separators 22. If the electrodes conform substantially to the internal measurements of case 20, no additional cementing or welding of the individual cover elements is required since separators 22 and case 20 will prevent the elements from sliding apart.

Referring now to FIGURES 3 and 4, the cover 24 for the active material 36 which surrounds the electrode rod 28 is customarily a suitable plastic foil or plastic fiber felt that is as thin walled as is permissible in consideration of the mechanical stresses that can arise in the electrode. An inner insulating layer 26 of a fibrous material such as a fabric or felt of glass fibers may surround the active material 36 which in turn surrounds rods 28. Rods 28 in turn are electrically connected through a cross rib 30 which is provided with a terminal piece 32. A lower rib 34 of a material such as iron connects the rods at the bottom and is applied after the cover has been placed over the rods.

The outer cover 24 may consist of any suitable acid resistant, electrical insulating plastic material such as polyvinyl chloride, polyester or comparable material that is sufficiently porous as by being perforated to allow the necessary electrolyte circulation while maintaining the active material 36 in place; or it may consist of an equivalent fibrous material in the form of a fabric or felt.

Figure 7:
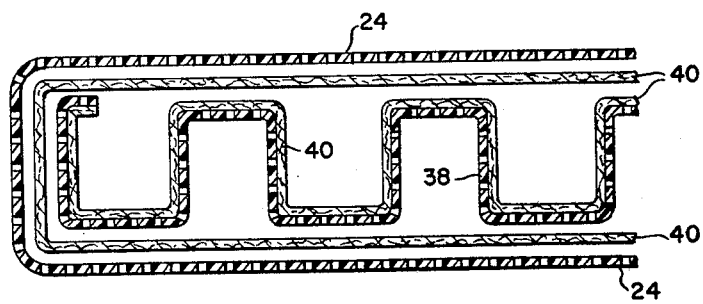
FIGURE 7 is a view similar to that of FIGURE 6 illustrating the use of a multiple layer of insulating fibers formed to have a convoluted shape and located between the individual electrode rods.
Figure 8:
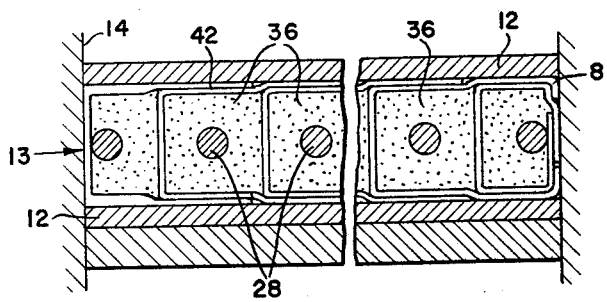
FIGURE 8 is a plan view in cross section of a further embodiment of the electrode illustrating the construction thereof by employing a plurality of C-shaped casing elements.

The convoluted partitioning portion 38 of the cover as shown in the embodiment of FIGURES 5, 6 and 7 may be of the same or a similar material as that of outer cover 24. A thin layer of glass fibers 40 may, according to the demands that are made with regard to the life of the finished electrode, be arranged as illustrated in FIGURE 6 where the insulation 40 is arranged only along the inner side of the outer cover 24, or as shown in FIGURE 7 where the insulation 40 also follows the course of convolutions 38. The number of convolutions in the partitioning portion is of course determined by the number of individual electrode elements the finished electrode is intended to comprise.

It is the practice in the industry to have electrodes of this type consist of either 15 or 19 rods or electrode elements. The electrode cover according to the invention is without difficulty suitable for a considerably greater number of rods or individual elements without weakening the mechanical structure since the individual rods are bound together not only by the continuous convoluted partitioning portion 38, but also by the continuous outer cover 24 which, as shown in FIGURE 5 and FIGURE 7, may completely enclose the convoluted portion 38.

In manufacturing an electrode according to the embodiment of the invention shown in FIGURES 5, 6, and 7, convolutions may be formed in a strip of plastic foil, for example a perforated polyester foil, having a width corresponding to the length of the electrode elements. These convolutions as shown in FIGURES 5, 6, and 7 may be formed by means of any suitable tool, for example a suitable number of mandrels which conveniently may be substantially square in cross section. As the convolutions are being formed about the mandrels, the outer cover 24 may be applied with or without the insertion of the insulation layer 40. The bonding of the convoluted partitioning portion 38 and the outer cover 24 is accomplished by any suitable means which can be carried out in the presence of the insulation layer 40 such as by welding or cementing. In the welding process, the cover material 24 and convoluted portion 38 are softened sufficiently to penetrate the fibrous insulating layer 40. In the cementing process, the cement penetrates fibrous insulation layer 40 insuring thereby a good bond.

Referring now to FIGURES 8–13, a cover according to a further embodiment of the invention will be described. The same reference numerals have been used for rods 28, active material 36 and insulation layer 26 (see FIGURE 12) but the outer cover 42 is formed different from the way the corresponding cover 24 is formed in the embodiment just described.

Figure 13:
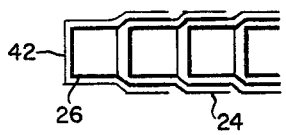
FIGURE 13 is a diagrammatic plan view of a cover arrangement slightly modified from that of the embodiment shown in FIGURES 8–12.

A plurality of individual cover elements 42 are provided from a band of cover material 24 and may include a layer of insulation 26 coextensive and formed simultaneously with the cover elements 42 (see FIGURE 13). A suitable method is first to join, as by means of cementing, the two bands of material of which the compound cover elements 42 and 26 is to consist, and to thereafter form the compound band around mandrels 44.

Figure 9:
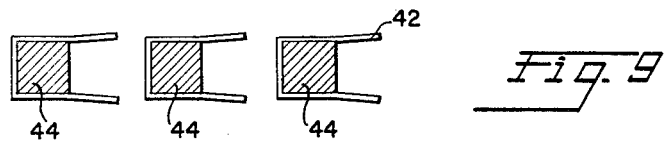
FIGURE 9 is a plan view in cross-section of three of the elements of FIGURE 8 illustrating the forming of the C-shaped cover members around mandrels prior to the stacking thereof.
Figure 10:
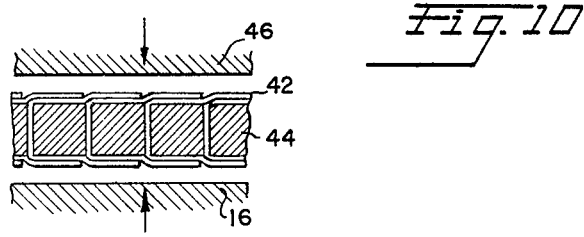
FIGURE 10 is a plan view in cross-section of the cover members of FIGURE 9 after stacking and being compressed between two pressure plates and prior to removal of the mandrels.
Figure 11:
FIGURE 11 is a plan view in cross-section of the stacked cover members of FIGURE 10 with the mandrels removed.

The cover may, as explained, consist of a single layer as shown in FIGURE 5 or may include insulation 26 as shown in FIGURE 13. In forming the elements 42, microporous material in the form of a band of suitable width may be bent under the influence of heat around mandrels 44 of the desired cross section. FIGURE 9 illustrates the result of this forming step. Thereupon the mandrels 44 are carried toward each other so the free arms of the elements 42 embrace the enclosed mandrel 44 of the adjacent element 42 as shown in FIGURE 10. Heating plates 46 or similar devices which are shown schematically in FIGURE 10 are pressed against the side surfaces of the cover elements, whereby the elements are pressed together for bonding.

By moistening the surfaces of the elements 42 with a solvent suitable for the material used, the elements 42 may be softened to such a degree that the applied heat and pressure effect welding of the elements 42 into a unitary structure. The bonding of the elements 42 may also be accomplished by means of a suitable cement with or without the application of heat. After bonding, the mandrels 44 are removed, whereupon an electrode cover according to the invention remains as shown in cross section in FIGURE 11.

The filling of the cover 24 with active material 36 about the rods 28 may be a difficult operation depending on the consistency and other qualities of the active material 36. If the active material 36 is in the form of a dough or paste or if it consists of relatively coarse particles, it may well be impossible to fill the cover 24 satisfactorily within a reasonable time in a conventional manner. In such cases the problem may be solved as shown in FIGURE 14.

The cover 24 consists of elements 42 bent at an angle of approximately 90° which may be placed in a suitable frame (not shown) so that the lower leg 50 of each element 42 forms a continuous bottom surface on which the active material 36 may be placed with the rods 28 embedded therein whereupon the upstanding leg 52 of each element 42 may be bent in the direction of the arrows 54 to enclose the rods 28 and the active material 36. The C-shaped elements 42 of the cover thus formed may then, if desired, be bonded together to form channels by means of cementing or welding as heretofore explained.

Another embodiment is shown in FIGURE 15, in which a number of Z-shaped cover elements 56 sufficient for the manufacture of the electrode are stacked so that the end sections thereof form opposite sides of adjacent channels, one end of each element 56 forming a portion of one side of the cover and the other end of each element 56 forming a portion of the other side of the cover. The elements 56 so stacked may then be wrapped with a unitary flat sheet of cover material 58 as shown in FIGURE 15 and abutting portions may be bonded together by means of cementing or welding by the application of vent and/or pressure as previously explained.

A still further embodiment is shown in FIGURE 16 in which a number of C-shaped cover elements 60 are formed by bending a length of cover material about the three sides of mandrels and then stacking the wrapped mandrels so that the open end of each of the C-shaped elements 60 abuts the closed end of the adjacent C-shaped element to form channels for the rods 28. The stacked elements may then be wrapped with a flat unitary sheet of covering material 62 as shown in FIGURE 16 and may be bonded into a unitary structure by cementing or welding after which the mandrels may be removed.

Still another embodiment is shown in FIGURE 17 wherein a number of square tubes 64 are formed by bending a length of the cover material around the four sides of a mandrel. The ends of the element may be, but are not necessarily secured together in the closed position shown. The tubes 64 are stacked, preferably with the mandrels in place, and the stacked elements may then be wrapped with a flat, unitary sheet of cover material 66. The abutting portions may, if desired, be bonded together prior to the removal of the mandrels.

In all of the embodiments heretofore described, the elements which comprise the unitary cover may be bonded, e.g. by welding or cementing. This bonding may not be necessary depending on the tendency of the cover material to hold its shape once deformed and the dimensions of the battery case in which it is to be fitted.

Figure 12:
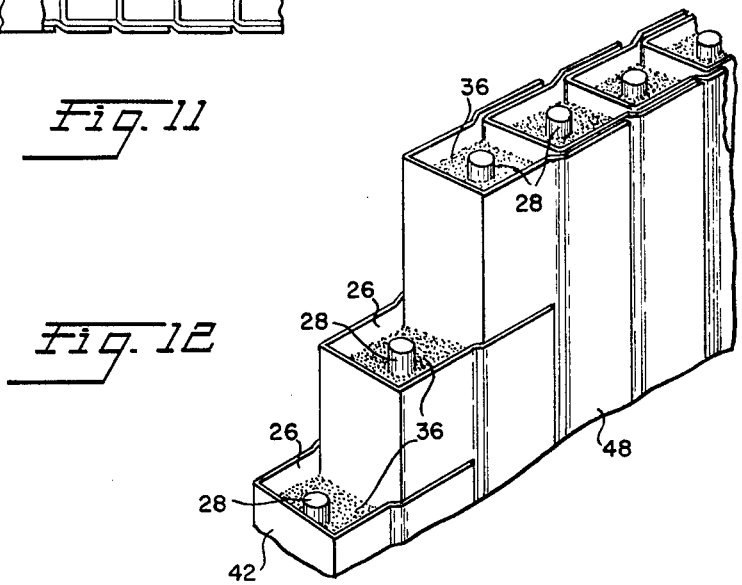
FIGURE 12 is a pictorial view of a finished electrode which is similar to that illustrated in FIGURE 8, but with portions at the left side cut away to better illustrate the construction.

The individual channels formed within the cover for the reception of active electrode material 36 may of course be given various cross-sectional shapes without departing from the scope of the present invention. Although the square form is preferable, the channels can be made in rectangular, triangular and curved forms, whereby the side surfaces 48 of the finished cover as shown in FIGURE 12 may be made planar smooth in order to maximize the use of the space available in the storage battery casing 20.

Among the advantages of an electrode manufactured in accordance with this over the methods previously known are that a more rigid structure having greater mechanical strength is provided, a substantial reduction in the expense of manufacturing is incurred since individual electrode element covers need not be produced and a reduced time is needed to apply the finished cover to the assembly of conductive rods usually cast as a unit with the upper transverse rib.

The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. An electric storage battery having positive and negative electrodes and a liquid electrolyte, said positive electrode comprising a plurality of parallel rods of conductive material spaced from one another and joined together by transverse connections, active material in contact with each rod, and a cover having a plurality of vertical channels for holding the active material for each of the individual rods in place, the cover for all the rods on a single positive electrode comprising at least two layers secured together of an electrical insulating material that is resistant to acid and to the reactions in the battery and sufficiently porous to allow electrolyte circulation to said active material but without permitting passage of the active material outside its respective channel, a first layer being an integral member of said insulating material, and each of said channels being formed to have four side walls effecting a complete enclosure of rectangular cross sections for each rod with two of said walls of each of said channels being substantially coplanar with two walls of each of the other of said channels in the plane of the electrode and the other two of said side walls being common to two adjacent channels and comprising only one layer secured to said first layer thereby reducing swelling of said active material.

2. The battery as defined in claim 1 wherein the cover has a thin layer of fibers on the inner surface of at least two sides of each of said channels.

3. The battery as defined in claim 2 wherein the fiber layer is composed of a felt of glass fibers.

4. The battery as defined in claim 1 wherein the cover has a thin layer of fibers on the complete inner surface of all sides of each of said channels.

5. The battery as defined in claim 1 wherein the cover includes a unitary sheet of said insulating material that extends along the entire height of said rods on opposite sides of the active material associated with said rods.

6. The battery as defined in claim 5 wherein the unitary sheet of insulating material extends the full length of the electrode to thus enclose the two opposite sides thereof, and wherein said cover includes a further unitary sheet of insulating material separating the active material associated with adjacent ones of said rods.

7. The battery as defined in claim 6 wherein the inner surfaces of both of said unitary sheets contains a thin layer of glass fibers.

8. The battery as defined in claim 6 wherein said further unitary sheet is a convoluted sheet secured to said first mentioned sheet at abutting surfaces to thereby provide said vertical channels.

9. The battery as defined in claim 1 wherein the cover comprises a plurality of U-shaped sheets of insulating material extending the full length of the electrode to enclose the two opposite sides thereof, the sides of said U-shaped sheets at the open end thereof overlying a portion of the sides of the adjacent U-shaped sheet at the closed end thereof to form said vertical channels.

10. The battery as defined in claim 9 wherein the sides of the end-most one of said U-shaped sheets having an open end are bent towards each other transverse of the electrode so as to close the end-most one of said channels.

11. The battery as defined in claim 9 wherein the abutting portions of said U-shaped sheets are bonded together by the application of heat and pressure.

12. The battery as defined in claim 1 wherein the cover comprises a plurality of Z-shaped elements, the center portion of each element separating said rods and the end portions of each of said elements forming opposite sides of adjacent channels and wherein said Z-shaped elements are exteriorly wrapped with a unitary sheet of cover material.

13. The battery as defined in claim 1 wherein the cover comprises a plurality of C-shaped elements, the open sides of each of said C-shaped elements abutting the closed end of the adjacent one of said C-shaped elements and wherein said elements are exteriorly wrapped with a unitary sheet of cover material.

References Cited

UNITED STATES PATENTS

| 630,753 | 8/1899 | Smith | 136—37 |
|---|---|---|---|
| 1,990,976 | 2/1935 | Booss | 136—147 |
| 2,490,630 | 12/1949 | Jardine | 136—147 |
| 2,511,887 | 6/1950 | Vinal | 136—145 |
| 2,747,007 | 5/1956 | Brandt | 136—55 XR |
| 2,934,585 | 4/1960 | Zahn | 136—147 |
| 2,981,783 | 4/1961 | Bushrod | 136—55 XR |
| 3,266,935 | 8/1966 | Boriolo | 136—43 |

FOREIGN PATENTS 791,108  2/1958  Great Britain.

WINSTON A. DOUGLAS, Primary Examiner

A. SKAPARS, Assistant Examiner

U.S. Cl. X.R.

136—55, 63, 147